June 4, 1946.  F. R. ARCHIBALD ET AL  2,401,326
PRODUCTION OF METAL HYDRIDES
Filed March 12, 1943
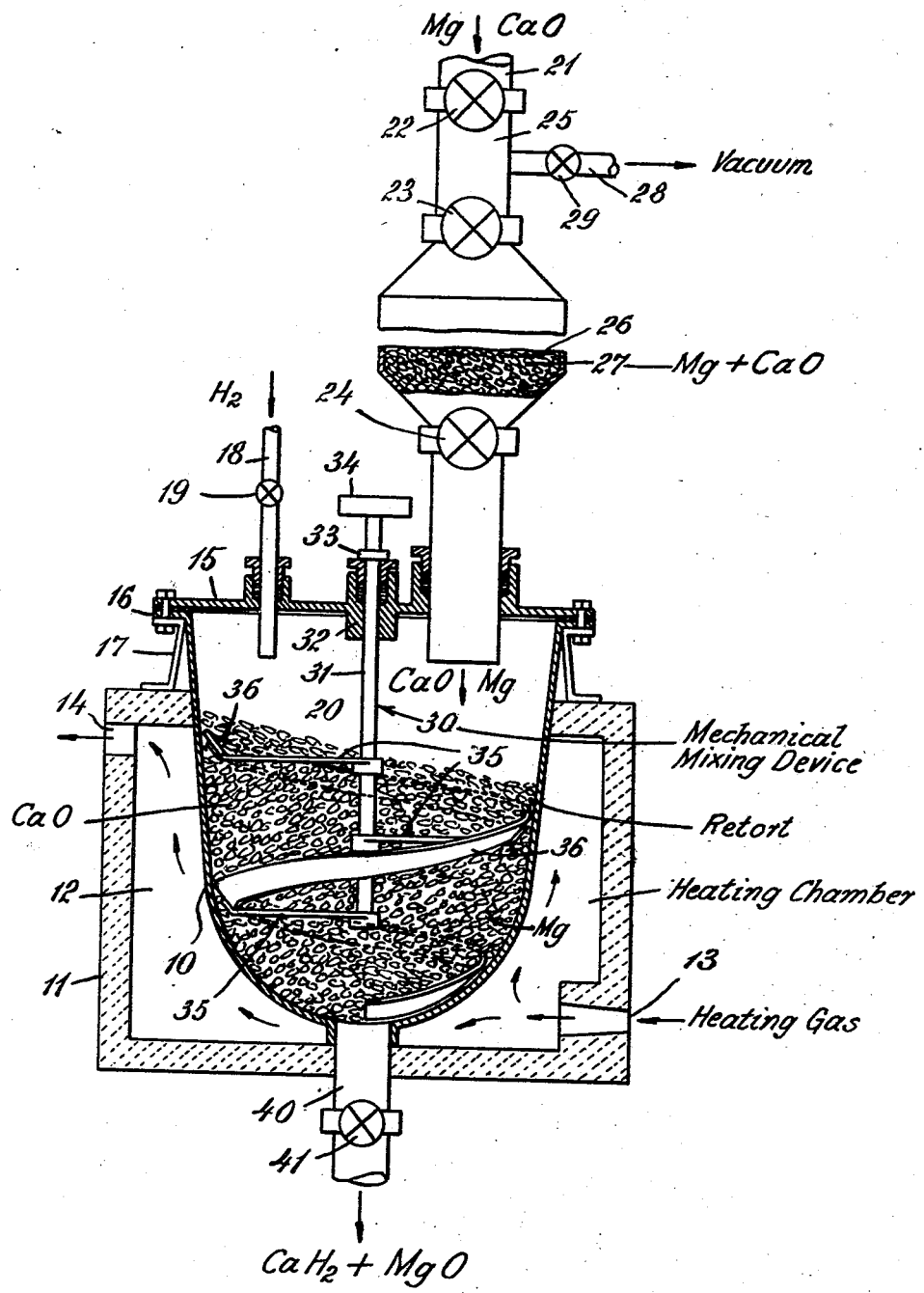
INVENTORS
FREDERICK R. ARCHIBALD
PETER P. ALEXANDER
BY
ATTORNEYS Patented June 4, 1946

2,401,326

UNITED STATES PATENT OFFICE 2,401,326

PRODUCTION OF METAL HYDRIDES

Frederick R. Archibald, Beverly, and Peter P. Alexander, Marblehead, Mass., assignors to Metal Hydrides Incorporated, Beverly, Mass., a corporation of Massachusetts Application March 12, 1943, Serial No. 478,884

20 Claims. (Cl. 23—204)

This invention relates to metal hydrides and has for its object certain improvements in the method of producing metal hydrides.

Several methods of making metal hydrides have been proposed. According to one of these methods, in the case of calcium hydride, for example, calcium oxide and powdered magnesium are placed in a container filled with hydrogen, after which the mixture is heated until it reaches a temperature above the melting point of magnesium. Sufficient hydrogen is then supplied to the container until the magnesium is oxidized and calcium hydride is formed, the reaction mass being raised to a temperature of 800–900° C. According to another method, fused or molten magnesium is gradually introduced into a container of calcium oxide and hydrogen and admixed therewith, the container and contents being heated to 800° C.

These methods have serious disadvantages when making calcium, or other metal, hydride in commercial quantities. Powdered magnesium is expensive and dangerous to make. It is usually made by grinding large pieces of magnesium in a suitable grinding device. The surfaces of the powdered magnesium particles acquire an oxide or other protective coating during the grinding operation and while in storage. This coating materially cuts down the amount and rate of the chemical activity of the powdered magnesium, so that complete conversion cannot be obtained. The voids or interstices between the particles are filled with air and it is difficult to de-aerate the magnesium powder. The mixture, therefore, takes on dangerous explosive characteristics when it is brought in contact with calcium oxide and hydrogen at elevated temperatures. The other method of making calcium hydride, in which fused or molten magnesium is employed, is dangerous also and offers substantial difficulties in practice. While the problem of de-aerating voids or interstices does not exist, it is nevertheless difficult to feed the molten magnesium in uniform and regulated amount to the container, as well as to mix the molten magnesium with the calcium oxide. In order to obtain the desired reaction, it is necessary to bring the hydrogen in wide contact with the admixed calcium oxide and molten magnesium. This effect cannot be obtained readily because the mixture tends to become sticky and packs or cakes against the walls or floor of the container, and the hydrogen cannot penetrate the sticky mixture. Furthermore, if the sticky mixture is rabbled, for example, to break it up, serious mechanical troubles are encountered. The mechanism employed becomes jammed and then stops.

As a result of our investigation, we have discovered certain improvements in the method of producing metal hydrides in the practice of which the disadvantages just mentioned may be substantially eliminated, although adhering, in the case of calcium hydride, for example, to the same general reaction:

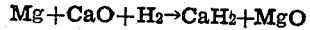
$$Mg + CaO + H_2 \rightarrow CaH_2 + MgO$$

A substantially lower temperature may be employed; and the magnesium and calcium oxide may be mixed while in contact with the hydrogen so that the reaction may proceed with little or no difficulty to form calcium hydride and magnesium oxide. The above general reaction is the result of two reactions, which may be indicated as follows:

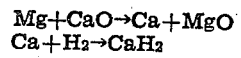
$$Mg + CaO \rightarrow Ca + MgO$$
$$Ca + H_2 \rightarrow CaH_2$$

The first is a reducing reaction, the calcium oxide being reduced by the magnesium to form calcium and magnesium oxide; and the second is the hydriding reaction, the reduced calcium reacting with the hydrogen gas to form calcium hydride.

In accordance with the present invention, a charge of magnesium and calcium oxide is heated in an atmosphere of hydrogen in a reaction zone to a temperature below that at which the magnesium fuses; that is, below 651° C., the fusion temperature of magnesium at normal pressures, but at which conversion of the calcium oxide to calcium hydride takes place. The charge is preferably mixed by moving the pieces of magnesium and calcium oxide particles relatively to one another so that exposed surfaces of the magnesium pieces coated with reaction product are subjected to attrition and made to present fresh surfaces. The heating and mixing of the charge in the presence of hydrogen is continued until the desired conversion of calcium oxide to calcium hydride takes place.

In a presently preferred practice of the invention, a charge of lime (calcium oxide) and granules of magnesium is placed in a suitable retort or furnace. The retort and charge are subjected to evacuation with a high vacuum pump to remove air that would otherwise form an explosive mixture with hydrogen. The de-aerating step is hastened by heating the retort and charge to, for example, about 400° C., and by mixing the charge, simultaneously. Hydrogen is then admitted to the retort and a suitable pressure, for example, 5 to 15 lbs., is maintained in the retort throughout the remainder of the operation. The charge is mixed to bring the hydrogen in wide contact with the pieces of magnesium and calcium oxide. After admission of hydrogen into the retort the temperature of the mixture is initially raised by the application of external heat to the retort. A suitable working temperature range at this stage is 550–650° C. After satisfactory consumption of hydrogen is indicated, the retort and charge are cooled during which time an atmosphere of hydrogen is maintained within the retort. When cool, the resulting mixture of calcium hydride and magnesium oxide is suitably withdrawn from the system.

The solid pieces of magnesium initially added to the charge are substantially larger than powder size. The magnesium may for example be in the form of shavings, turnings, or pieces having a half inch to a side or smaller, and preferably, greater than 10 mesh.

It is advantageous to start operations by de-aerating the charge and retort and then externally heating the retort and charge to start the conversion. The resulting chemical reaction is exothermic, giving off considerable heat. To avoid overheating the charge, the application of external heat is stopped and provision is made to remove or dissipate exothermic heat at a rate adapted to keep the charge at a temperature below the fusion point of the magnesium but at a temperature sufficiently high to permit the conversion to go to completion. The end of the conversion is indicated by a lack of consumption of hydrogen.

These and other features of the invention will be better understood by referring to the accompanying drawing, taken in conjunction with the following description, which is a schematic outline of an apparatus adapted for a practice of the invention.

The apparatus shown comprises a pot retort 10 suitably suspended within a furnace 11 having a heating chamber 12 with a conduit 13 near the bottom and a flue opening 14 near the top thereof through which to introduce heating gases and to remove spent gases from the chamber. The retort is advantageously made of heat-resistant steel. It is provided with a removable cover 15, which may be bolted to a flange 16 extending circumferentially around the open end of the retort. The retort is suspended in the chamber by means of a plurality of spaced supports 17 extending between the flange and the top of the furnace. A pipe 18 with a valve 19 fits into the cover for the introduction of hydrogen gas to the interior or reaction zone 20 of the retort. The cover is also provided with a charging conduit 21 to supply granules of magnesium to the interior of the retort. As shown, the conduit is fitted with three spaced valves 22, 23 and 24 to provide an evacuating passageway 25 and a trap 26 of sufficient size to receive a substantial charge of magnesium granules 27. A pipe 28 with a valve 29 connects the evacuating passageway with a source of vacuum, not shown.

A mechanical mixing device 30 fits within the interior of the retort. It is provided with a vertical shaft 31, the upper end of which extends through the cover and is suitably held in position by a bearing 32 and a collar 33 secured to the shaft. The upper end of the shaft is also equipped with a pulley 34 connectable with a source of power, not shown. The lower part of the shaft is fitted with a plurality of lateral supports 35 to which is attached a helical metallic ribbon 36 adapted to follow the contour of the inside of the retort so as to raise charge materials confined therein along the inside surface of the retort, and then to roll them toward the center, thereby intimately mixing the charge materials.

A discharge conduit 40 connects with the bottom of the retort and extends through the bottom of the furnace. A valve 41 is provided in the conduit below the furnace bottom for the removal of treated charges from the retort.

In accordance with the practice of the invention, the cover 15 is appropriately bolted to the flange 16 to assure a sealed joint. Heating gases are passed through the conduit 13 into the heating chamber 12, so that the bottom of the retort is heated. Spent heating gases escape through the flue opening 14. The valves 24, 23 and 29 are opened and the valves 19, 22 and 41 are closed until the air and other gaseous products are evacuated from the interior of the retort. This may be accomplished by connecting the conduit 28 with a vacuum pump, not shown. Toward the end of the evacuation period, valve 19 is opened and some hydrogen is advantageously passed through pipe 18 into the retort. To hasten the evacuation step, the temperature of the interior of the retort, may for example, be raised to around 400° C.

On completion of the evacuation step, valves 24 and 29 are closed, valve 22 is opened and a charge of lime and granular magnesium 27 is passed into the conduit 21 and dropped into trap 26; after which valve 22 is closed and valve 29 is opened to evacuate trap 26. Valves 23 and 29 are then closed and valve 24 is opened so that the lime and granules of magnesium are dropped into the retort.

Additional heating gases are passed into the heating chamber 12 to raise the temperature of the charge within the retort to 550–650° C. The mechanical mixing device 30 is rotated to mix the granular magnesium and calcium oxide intimately and to bring hydrogen introduced through pipe 18 in intimate contact therewith. As the conversion or reaction takes place, exothermic heat is given off and the supply of heating gases to the heating chamber 12 is discontinued. Additional amounts of hydrogen are introduced into the retort until the calcium oxide has been substantially completely converted to calcium hydride. The temperature of the charge is maintained below the fusion point of the magnesium, for example, 550–650° C., as the reaction goes to completion. While the temperature may be checked in various ways, we have found that it is practical to employ a hollow shaft 31, in which is placed a suitable thermocouple. If the temperature tends to rise above that desired, cooling air may be forced through conduit 13 into chamber 12, in amounts adapted to dissipate the extra heat. After the conversion step is completed, valve 41 is opened to discharge the reaction products from the retort, preferably while the mixing mechanism continues to rotate.

We have frequently observed that pieces of magnesium metal, when heated with calcium oxide in the presence of hydrogen, became pitted and partially eaten away at temperatures below the melting point of magnesium. If the charge of magnesium and calcium oxide is not mixed during heating, and is then cooled, we found that the pieces of magnesium are irregularly reduced in size without showing evidence of having melted. Such evidence might be the presence of metal in globules, prills or skeletal shapes in and about the particles of calcium oxide. On the other hand, if a mixture of proper proportions is stirred so that the magnesium and calcium oxide pieces continue to present fresh surfaces, not covered with reaction product, to the hydrogen, the pieces of magnesium disappear entirely. We have also found that lumps of calcined calcium oxide as large as one half inch to a side can be converted to calcium hydride and still maintain their original size and shape. This could only occur if the necessary reactants, magnesium and hydrogen, made their way into the lumps of calcium oxide as vapor or gas. It appears evident from these observations, therefore, that the reaction, under the conditions noted, must involve transference of magnesium in the vapor phase, either as metal vapor or as a volatile compound with hydrogen. The transfer of magnesium in the vapor state from the solid magnesium pieces is comparable to the mechanism of sublimation.

While the production of calcium hydride has been described in some detail as illustrative of the invention, it will be clear to those skilled in this art that the invention is applicable to the production of the hydrides of other metals. Magnesium may be made to react similarly in the presence of hydrogen with the other hydride-forming metals. The invention is particularly applicable to the production of the hydrides of barium, strontium, titanium and zirconium from their oxides.

By conducting the conversion step below the fusion point of the magnesium, the tendency of the charge to become sticky is inhibited. After the conversion has largely taken place, and most of the magnesium has been oxidized, it may be desirable to raise the temperature of the charge above the fusion point of magnesium, but below the dissociation point of the metal hydride already formed, to complete the conversion. Fusion of the small amount of magnesium then remaining in the charge does not materially affect the charge so far as stickiness is concerned, but does aid in driving the last stage of the conversion to completion. The rate of dissipation of exothermic heat from the charge may be suitably slowed, or the retort may be suitably heated by the introduction of additional heating gases into the furnace chamber, to obtain the desired temperature rise.

We claim:

1. In the method of producing calcium hydride, the improvement which comprises heating a charge of magnesium and calcium oxide in an atmosphere of hydrogen in a reaction zone to a temperature below that at which the magnesium fuses, said magnesium being initially present in the charge in the form of granular solid pieces substantially larger than powder size, maintaining the charge at a temperature below that at which the magnesium fuses but at which conversion of the calcium oxide to calcium hydride takes place, intimately mixing the charge by moving the pieces of magnesium and calcium oxide particles relatively to one another so that exposed surfaces of the magnesium pieces coated with reaction product are subjected to attrition and made to present fresh surfaces, and continuing the heating and mixing of the charge in the presence of hydrogen until the desired conversion of calcium oxide to calcium hydride takes place.

2. Method of producing calcium hydride according to claim 1, in which the charge of magnesium and calcium oxide in the reaction zone is initially placed under vacuum, heated and mixed to de-aerate the reaction zone as well as the interstices between and within adjacent pieces of magnesium and calcium oxide.

3. Method according to claim 1, in which the reaction zone is maintained under suitable positive pressure with hydrogen while the charge is heated and mixed.

4. Method according to claim 1, in which the charge is brought up to and maintained at a temperature of 550–650° centigrade.

5. Method according to claim 1, in which additional hydrogen is introduced into the reaction zone as the conversion of calcium oxide to calcium hydride progressively takes place, cooling the charge after the reaction has gone to completion while maintaining an atmosphere of hydrogen in the reaction zone, and withdrawing the resulting mixture of calcium hydride and magnesium oxide from the reaction zone.

6. In the method of producing calcium hydride, the improvement which comprises feeding a charge of magnesium and calcium oxide and a stream of hydrogen to a reaction zone, said magnesium being initially present in the charge in the form of granular solid pieces substantially larger than powder size, maintaining the charge at a temperature below that at which the magnesium fuses but at which conversion of the calcium oxide to calcium hydride takes place, intimately mixing the charge by moving the pieces of magnesium and calcium oxide particles relatively to one another so that exposed surfaces of the magnesium pieces coated with reaction product are subjected to attrition and made to present fresh surfaces, continuing the heating and mixing of the charge in the presence of hydrogen until the desired conversion of calcium oxide to calcium hydride takes place, and withdrawing the resulting mixture of calcium hydride and magnesium oxide from the reaction zone.

7. In the method of producing metal hydrides, the improvement which comprises heating a charge of magnesium and the oxide of a hydride-forming metal in an atmosphere of hydrogen in a reaction zone to a temperature below that at which the magnesium fuses, said magnesium being initially present in the charge in the form of granular solid pieces substantially larger than powder size, maintaining the charge at a temperature below that at which the magnesium fuses but at which conversion of the metal oxide to metal hydride takes place, intimately mixing the charge by moving the pieces of magnesium and metal oxide particles relatively to one another so that exposed surfaces of the magnesium pieces coated with reaction product are subjected to attrition and made to present fresh surfaces, and continuing the heating and mixing of the charge in the presence of hydrogen until the desired conversion of metal oxide to metal hydride takes place.

8. Method of producing metal hydride according to claim 7, in which the charge of magnesium and metal oxide in the reaction zone is initially placed under vacuum, heated and mixed to de-aerate the reaction zone as well as the interstices between and within adjacent pieces of magnesium and metal oxide.

9. Method according to claim 7, in which the charge of magnesium and metal oxide is brought up to and maintained at a temperature of 550–650° centigrade.

10. Method according to claim 7, in which additional hydrogen is introduced into the reaction zone as the conversion of metal oxide to metal hydride progressively takes place, cooling the charge after the reaction has gone to completion while maintaining an atmosphere of hydrogen in the reaction zone, and withdrawing the resulting mixture of metal hydride and magnesium oxide from the reaction zone.

11. In the method of producing metal hydrides, the improvement which comprises heating a charge of magnesium and the oxide of a hydride-forming metal selected from the group: calcium, barium, strontium, titanium and zirconium in an atmosphere of hydrogen gas; said magnesium being initially present in the charge in the form of granular solid pieces substantially larger than powder size, maintaining the charge at a temperature below that at which the magnesium fuses but at which conversion of the metal oxide to metal hydride takes place, intimately mixing the charge by moving the pieces of magnesium and metal oxide particles relatively to one another so that exposed surfaces of the magnesium pieces coated with reaction product are subjected to attrition and made to present fresh surfaces, and continuing the heating and mixing of the charge in the presence of hydrogen until the desired conversion of metal oxide to metal hydride takes place.

12. In the method of producing metal hydrides, the improvement which comprises heating a charge of magnesium and the oxide of a hydride-forming metal selected from the group: calcium, barium, strontium, titanium and zirconium in an atmosphere of hydrogen gas; maintaining the charge at a temperature below that at which the magnesium fuses but at which conversion of the metal oxide to metal hydride takes place, and continuing the heating of the charge in the presence of hydrogen until the desired conversion of metal oxide to metal hydride takes place.

13. In the method of producing metal hydrides, the improvement which comprises heating a charge of magnesium and the oxide of a hydride-forming metal selected from the group: calcium, barium, strontium, titanium and zirconium in an atmosphere of hydrogen gas; maintaining the charge at a temperature below that at which the magnesium fuses but at which conversion of the metal oxide to metal hydride takes place, intimately mixing the charge by moving the pieces of magnesium and metal oxide particles relatively to one another so that exposed surfaces of the magnesium pieces coated with reaction product are subjected to attrition and made to present fresh surfaces, and continuing the heating and mixing of the charge in the presence of hydrogen until the desired conversion of metal oxide to metal hydride takes place.

14. Method according to claim 13, in which the temperature of the charge is raised above the fusion point of the magnesium but below the dissociation point of the metal hydride near the end of the conversion step.

15. In the method of producing calcium hydride, the improvement which comprises confining a charge of intimately admixed calcium oxide and metallic magnesium in a reaction zone, the magnesium being in the form of granular solid pieces substantially larger than powder size, evacuating the reaction zone and charge to remove air therefrom, heating the charge to a temperature below that at which the magnesium fuses but at which the calcium oxide is reduced, and converting the heated reduced calcium to calcium hydride by reacting the calcium with hydrogen gas admitted to the reaction zone.

16. Method of producing calcium hydride according to claim 15, in which the charge is intimately mixed by moving the pieces of magnesium and the particles of calcium oxide relatively to one another so that exposed surfaces of the pieces of the magnesium coated with reaction product are subjected to attrition and made to present fresh surfaces as the calcium oxide is reduced.

17. Method of producing calcium hydride according to claim 15, in which the temperature of the charge is raised above the fusion point of the magnesium but below the dissociation point of the calcium hydride near the end of the conversion step to drive the last stage thereof to completion.

18. In the method of producing metal hydrides, the improvement which comprises confining a charge of intimately admixed pieces of metallic magnesium and the oxide of a hydride-forming metal selected from the group: calcium, barium, strontium, titanium and zirconium in a reaction zone, the magnesium being in the form of granular solid pieces substantially larger than powder size, evacuating the reaction zone and charge to remove air therefrom, heating the charge to a temperature below that at which the magnesium fuses but at which the oxide of the hydride-forming metal is reduced, and converting the heated reduced hydride-forming metal to its hydride by reacting the reduced metal with hydrogen gas admitted to the reaction zone.

19. Method of producing metal hydrides according to claim 18, in which the charge is intimately mixed by moving the pieces of magnesium and the particles of oxide of the hydride-forming metal relatively to one another so that exposed surfaces of the pieces of magnesium coated with reaction product are subjected to attrition and made to present fresh surfaces as the oxide of the hydride-forming metal is reduced.

20. Method of producing metal hydrides according to claim 18, in which the temperature of the charge is raised above the fusion point of the magnesium but below the dissociation point of the metal hydride near the end of the conversion step to drive the last stage thereof to completion.

FREDERICK R. ARCHIBALD.
PETER P. ALEXANDER.